United States Patent Office 3,373,215
Patented Mar. 12, 1968

3,373,215
ACID CATALYZED ISOMERIZATION OF CYCLIC-MONOOLEFINS
Paul R. Stapp, Bartlesville, Okla., assignor to Phillips Petroleum Company, a corporation of Delaware
No Drawing. Filed June 27, 1966, Ser. No. 560,815
8 Claims. (Cl. 260—666)

This invention relates to isomerization. In one aspect, the invention relates to the isomerization of cyclomonoolefins containing from 6 to 15 carbon atoms in the ring by contacting said cyclomonoolefin with an acid catalyst. In another aspect, the invention relates to the formation of isomers having at least one less carbon atom in the ring from cyclomonoolefins containing from 6 to 15 carbon atoms in the ring by contacting said cyclomonoolefin with a supported acid catalyst. In another aspect, the invention relates to the isomerization of cyclomonoolefins containing from 6 to 15 carbon atoms in the ring by contacting said cyclomonoolefin with an acid catalyst or a supported acid catalyst in the presence of an inert diluent such as a saturated hydrocarbon. In still another aspect, the invention relates to the isomerization of cyclomonoolefins and substituted cyclomonoolefins containing from 6 to 15 carbon atoms in the ring and preferably up to a total of about 25 carbon atoms at relatively mild reaction conditions.

Those skilled in the art are familiar with isomerization reactions catalyzed by acids or supported acids. For example, acid catalyzed isomerizations have been used to convert 1-olefins to 2-olefins, as disclosed in U.S. Patent 2,330,115. However, in the usual isomerization reaction involving olefins, dimers and trimers are produced in large quantities. It is an object of this invention to isomerize cyclomonoolefins while preventing the formation of dimers, trimers, and other heavy by-products. It is also an object of this invention to produce isomers having at least one less carbon atom in the ring from cyclomonoolefins containing 6 to 15 carbon atoms in the ring and preferably up to a total of about 25 carbon atoms at milder reaction conditions than have heretofore been used.

Other aspects, objects and the several advantages of the invention will become apparent to one skilled in the art from a reading of the specification and appended claims.

In accordance with the invention, a process is provided for isomerizing a cyclomonoolefin or substituted cyclomonoolefin containing from 6 to 15 carbon atoms in the ring to a mixture of cyclic monoolefins or substituted cyclomonoolefins having at least one less carbon atom in the ring which comprises contacting said cyclomonoolefin with a suitable acid catalyst in an inert diluent under isomerizing conditions. As used hereinafter, it will be understood that the term "cyclomonoolefins" includes substituted and unsubstituted cyclomonoolefins which may contain other substituents that do not hinder the isomerization reaction, and are not reactive under the process conditions. The contact time of the cyclomonoolefin with the acid catalyst is limited so as to prevent the formation of dimers, trimers, and other heavy by-products. Typically, the temperature at which the reaction occurs will be maintained below 300° C.

Among the suitable isomerization catalysts which can be employed in the practice of this invention are concentrated sulfuric acids, containing from 70 to 90 percent by weight of $H_2SO_4$, an acid of phosphorus adsorbed on a solid adsorbent, polyphosphoric acids, boron trifluoride, and boron trifluoride hydrates.

The catalyst comprising an acid of phosphorus supported on a solid adsorbent can be prepared by any suitable method known to those skilled in the art. According to one method, a solid adsorbent material is mixed with an acid of phosphorus which can be present in an amount of 30 to 80 percent of the resulting mixture. The mixture is calcined at a temperature of about 450 to about 510° C. to cause extensive dehydration of said acid and hardening of the composite particles, and is then partially rehydrated by treatment with water and/or steam at a temperature lower than that employed in the calcining step, e.g., from about 200 to about 260° C.

Any suitable acid of phosphorus can be used in the preparation of said supported phosphoric acid catalyst. Acids of phosphorus wherein phosphorus has a valence of 5 are usually preferred. Orthophosphoric acid ($H_3PO_4$) is usually most preferred due to its cheapness and ready availability. Orthophosphoric acids containing from approximately 85 to 100 percent, or acids containing some free phosphorus pentoxide may be used.

Any suitable solid adsorbent material can be employed as the adsorbent or carrier for said acid of phosphorus. The adsorbents of a predominantly siliceous character such as diatomaceous earth, kieselguhr, porous silica such as, for example, Sil-O-Cel, and so on are generally preferred. Another class of solid adsorbent materials which can be employed, either alone or in conjunction with said predominantly siliceous materials, include the adsorbents which are predominantly aluminum silicates, such as the naturally occurring substances including the various fuller's earths and clays such as bentonite, montmorilonite, and so on. The various acid treated silicates are also included.

The polyphosphoric acid catalysts of the invention can be prepared by any suitable manner known to those skilled in the art. One method for preparing such catalysts comprises mixing phosphorus pentoxide with orthophosphoric acid in desired amounts and heating the resulting mixture.

As used herein and in the claims, unless otherwise specified, the term "boron trifluoride hydrates" includes $BF_3 \cdot H_2O$, $BF_3 \cdot 2H_2O$ and $BF_3 \cdot 3H_2O$.

In the practice of the invention, it is important that the isomerization be conducted in the presence of an inert diluent, which is preferably a saturated hydrocarbon or mixtures of saturated hydrocarbons containing from 5 to 8 carbon atoms. Suitable diluents include: n-pentane, i-pentane, n-hexane, n-heptane, n-octane, i-octane, cyclohexane, cyclopentane, 2,3-dimethylhexane, etc., or mixtures thereof. The volume ratio of reactant to diluent can vary from 10:1 to 1:10. Preferably, the said volume ratio is within the range of from 5:1 to 1:2.

In one embodiment, the isomerization is carried out in a continuous flow apparatus at a temperature within the range of from about 100° to about 300° C., preferably from about 150° to about 250° C. It is important to limit the contact time of the cyclomonoolefin with the catalyst by suitably adjusting the space velocity to prevent the secondary reaction of condensation from occurring. It is apparent that shorter contact times are preferable at higher temperatures. In this way, a non-equilibrium mixture of the isomers is obtained from which the desired product can be separated by any conventional method, for example, extraction or distillation. The unconverted starting material and diluent are then recycled to the reactor for further isomerization.

Among the cyclomonoolefins which can be isomerized by the practice of the invention are: cyclohexene, cyclooctene, cyclodecene, cyclododecene, cyclopentadecene, 2-methylcyclohexene, 3-methylcyclohexene, 4-ethylcyclohexene, 1,3,5-trimethylcyclohexene, 1-methylcyclooctene, 2,4,6-trimethylcyclooctene, 4-propylcyclodecene, 3,5,7-trimethylcyclododecene, 3-chlorocyclohexene, 4-bromocyclohexene, 2-methyl-3-chlorocyclooctene or other substituent groups inactive under the reaction conditions may be present on the ring structure. Preferably, the total number of carbon atoms in the compound should not exceed about 25.

Those skilled in the art will realize that the process of the invention can be carried out by either a batch or continuous process.

EXAMPLE I 15 grams of a catalyst consisting of phosphoric acid on kieselguhr was placed in a flow reactor. The reactor was brought to the operating temperature of 200° C. while being flushed with dry nitrogen to remove adsorbed moisture from the system. The feed was 60 ml. of cyclooctene diluted by 60 ml. of n-pentane. The mixture was passed through the reactor once at the rate of 1.5 ml./min. The effluent was distilled, and the fractions recovered comprised 1-methylcycloheptene (50%), 1-ethylcyclohexene (25%) and other isomers (25%). No dimerization product was found. Ultimate yield of 1-methylcycloheptene is 50 percent.

EXAMPLE II

Three runs were made in the reactor used in Example I with cyclohexene in a saturated hydrocarbon solvent at a flow rate of 1 ml./min. Details and results are indicated in Table I.

TABLE I

| Solvent | Catalyst, grams | Temp., °/C. | Conversion, percent | Selectivity to 1-methylcyclopentene, percent |
|---|---|---|---|---|
| n-Heptane | 8 | 200 | 15.7 | 74.5 |
| Do | 10 | 200 | 16.4 | 74.4 |
| n-Pentane | 10 | 250 | 52.0 | 78 |

The byproducts were identified as isomeric methylcyclopentenes. No dimers were produced in the runs at the lower temperature but 4.8 grams of heavier residues were recovered from the run at 250° C., indicating that a higher flow rate would be desirable at this temperature.

EXAMPLE III

Another run was made using 60 ml. cycloctene in 60 ml. of n-pentane as a diluent over 8 grams of catalyst at 160° C. and a flow rate of 1 ml./min. Cyclooctene conversion was 55 percent and the ultimate yield was calculated at 61.5 percent 1-methylcycloheptene and 13.3 percent 1-ethylcyclohexene with the remainder isomers of these products. No dimers or trimers were produced.

EXAMPLE IV

The effect of diluent on product distribution in the formation of by-products is clearly illustrated by this example.

A 12″ x 1″ distilling column was packed with 24 grams of the catalyst and a distilling head was attached to the column. A 300 ml. distilling flask was charged with 188 grams cyclooctene and it was refluxed over the column containing the catalyst for 12 hours (138° C., 760 mm. Hg).

The mixture was distilled and gave a cut at 125°–138° C. of 116 grams which was identified by GLC/mass spectrometer analysis as 1-ethylchlohexene (53.4%) and 1-methylcycloheptene (21.8%) and isomers of these. There was 51 grams of heavy material (dimers or higher) recovered. 90 percent of the cyclooctene had been converted to products but 30 percent of this product was a condensation product.

Reasonable variation and modification is possible within the spirit and scope of the invention, the essence of which is a process for isomerizing a cyclomonoolefin containing from 6 to 15 carbon atoms in the ring which comprises contacting said cyclomonoolefin with an acid catalyst in an inert diluent under isomerizing conditions.

I claim:

1. A process for isomerizing a cyclic-monoolefin containing from 6 to 15 carbon atoms in the ring to a mixture of cyclic-monoolefins having at least one less carbon atom in the ring which comprises contacting said cyclic-monoolefin with an acid catalyst in an inert diluent under isomerizing conditions at a temperature below 300° C.

2. A process according to claim 1 wherein said acid catalyst is selected from the group consisting of concentrated sulfuric acid, an acid of phosphorus supported on a solid adsorbent, polyphosphoric acid, boron trifluoride, and boron trifluoride hydrates.

3. A process according to claim 1 wherein the temperature is within the range of 100 to 300° C.

4. A process according to claim 1 wherein said diluent is a saturated hydrocarbon.

5. A process according to claim 4 wherein said saturated hydrocarbon is selected from
   (a) a saturated hydrocarbon containing from 5 to 8 carbon atoms, and
   (b) a mixture of saturated hydrocarbons, each containing from 5 to 8 carbon atoms.

6. A process according to claim 5 wherein the volume ratio of said cyclomonoolefin to said diluent is within the range of from 10:1 to 1:10.

7. A process according to claim 6 wherein said cyclomonoolefin is selected from cyclohexene and cyclooctene.

8. A process according to claim 7 wherein said catalyst is phosphoric acid on kieselguhr, and said diluent is selected from n-heptane and n-pentane.

References Cited

UNITED STATES PATENTS

| | | | |
|---|---|---|---|
| 2,330,115 | 9/1943 | Drennan | 260—683.2 |
| 2,379,731 | 7/1945 | McAllister | 260—683.2 |
| 2,846,486 | 7/1958 | Rummelsburg | 260—666 |
| 2,890,251 | 6/1959 | Flavin et al. | 260—666 |
| 3,151,173 | 9/1964 | Nyce | 260—666 |
| 3,185,739 | 5/1965 | Gray et al. | 260—666 |

OTHER REFERENCES

J. E. Germain et al., Memoires Societ. Chemi., 5e Series, pp. 473–481, 1960.

DELBERT E. GANTZ, *Primary Examiner.*

V. O'KEEFE, *Assistant Examiner.*